US005924720A

United States Patent [19]

Keehne

[11] Patent Number: 5,924,720

[45] Date of Patent: Jul. 20, 1999

[54] WHEELCHAIR WITH ELEVATABLE SEAT

[76] Inventor: Robert W. Keehne, 4180 Ottawa Trail, Shelby, Mich. 49455

[21] Appl. No.: 08/833,262

[22] Filed: Apr. 3, 1997

[51] Int. Cl.$^6$ .......... B62B 1/00

[52] U.S. Cl. .......... 280/657; 180/907

[58] Field of Search .......... 280/250.1, 304.1, 280/638, 657; 180/65.1, 97; 5/83.1, 87.1, 81.1 R, 652, 657; 414/921; 297/344.1, 344.12, 344.15, 344.19, DIG. 4

[56] References Cited

U.S. PATENT DOCUMENTS

| | | | |
|---|---|---|---|
| 2,233,262 | 2/1941 | Jacobson | 155/30 |
| 2,565,536 | 8/1951 | Valentine . | |
| 2,747,652 | 5/1956 | Marsh | 155/288 |
| 3,882,949 | 5/1975 | Anderson | 180/8 A |
| 4,351,562 | 9/1982 | Twitchell | 297/345 |
| 4,375,840 | 3/1983 | Campbell | 180/6.5 |
| 4,477,117 | 10/1984 | Higgs | 297/45 |
| 4,613,151 | 9/1986 | Kielczewski | 280/650 |
| 4,614,246 | 9/1986 | Masse | 180/6.5 |
| 5,042,607 | 8/1991 | Falkenson | 180/208 |
| 5,046,571 | 9/1991 | Kullerud | 180/65.1 |
| 5,090,513 | 2/1992 | Bussinger | 180/271 |
| 5,112,076 | 5/1992 | Wilson | 280/657 |
| 5,201,377 | 4/1993 | Wilson | 180/6.5 |
| 5,209,322 | 5/1993 | McMahon | 180/271 |
| 5,217,239 | 6/1993 | Koet | 280/250.1 |
| 5,255,934 | 10/1993 | Wilson | 280/657 |
| 5,363,934 | 11/1994 | Edmund | 180/6.5 |
| 5,435,404 | 7/1995 | Garin, III | 180/6.5 |
| 5,458,349 | 10/1995 | Mung-Tung | 280/250.1 |

FOREIGN PATENT DOCUMENTS

| | | |
|---|---|---|
| 2275029 | 2/1993 | United Kingdom . |

*Primary Examiner*—Robert J. Oberleitner
*Assistant Examiner*—C. J. Bartz
*Attorney, Agent, or Firm*—Price, Heneveld, Cooper DeWitt & Litton

[57] ABSTRACT

An elevatable wheelchair having a horizontal base and a plurality of front and rear wheels for traveling over a surface, a support frame upstanding from the rear of the base, a cantilever beam pivotally attached at its rear end to the frame above the base, a seat pivotally mounted on the forward end of the cantilever beam, a power lift operably connected to the cantilever beam between its ends for pivoting the beam on the frame to elevate or lower the beam forward end and the seat, and a stabilizing arm between the seat and the frame, vertically offset from the beam, and movable with the beam and seat to control seat pivot orientation and to stabilize the seat.

14 Claims, 5 Drawing Sheets

WHEELCHAIR WITH ELEVATABLE SEAT

BACKGROUND OF THE INVENTION

This invention relates to a lifting wheelchair, and particularly to a wheelchair having an elevatable seat providing ready access to elevated locations such as cupboards, refrigerator/freezer, storage closets, upper windows, and elevated work places, even several feet above the floor, and to do so with stability and controlled orientation of the seat.

A common difficulty experienced by persons using wheelchairs, including motorized wheelchairs, is the inability to reach elevated items or work places, and to remain at such elevated positions as long or short a time as necessary.

There have been some suggested concepts for elevating the seat of a wheelchair, such as in U.S. Pat. Nos. 4,613,151; 5,435,404; 4,614,246; 5,255,934; 5,209,332; 5,112,076; 5,090,513; 5,046,571; 4,351,562; 3,882,949; and GB 2275029. One common disadvantage has been the inability of the elevated person to be close enough to the target item to get full access, even if the chair is elevated high enough. Another common difficulty is the limited elevation which is possible with known systems.

SUMMARY OF THE INVENTION

An object of this invention is to provide an elevatable wheelchair capable of hoisting the person to any selected height, even over six feet, with stability, and to retain the person at the selected elevation as long as desired. The chair or seat, when partially elevated, projects forwardly of its base to be closely adjacent the target device, to thereby allow complete access for working or other activities. Thus, the novel wheelchair enables the handicapped person to fulfill normal duties with full access comparable to those persons without a handicap. When fully hoisted, the seat again moves in back of the front wheels, as it was in fully lowered condition.

The wheelchair is preferably on a wheeled base having power drive apparatus. The seat is mounted on the forward end of a cantilever beam, the opposite end of the cantilever beam being pivotally mounted to an upstanding triangular frame on the rear of the base. A stabilizing and seat angle control bar extends from the seat to the frame, offset vertically from the cantilever beam. In the fully lowered position, the seat is behind the front wheels for best driving traction. In a partially elevated position the seat moves forwardly to partially extend above the front wheels for best access to a target area or device. In fully elevated position, the seat again reverts to a position behind the wheels for maximum stability.

These and other objects, advantages and features of the invention will become apparent upon studying the following specification in conjunction with the drawings.

DESCRIPTION OF PREFERRED EMBODIMENT

Figure 1:
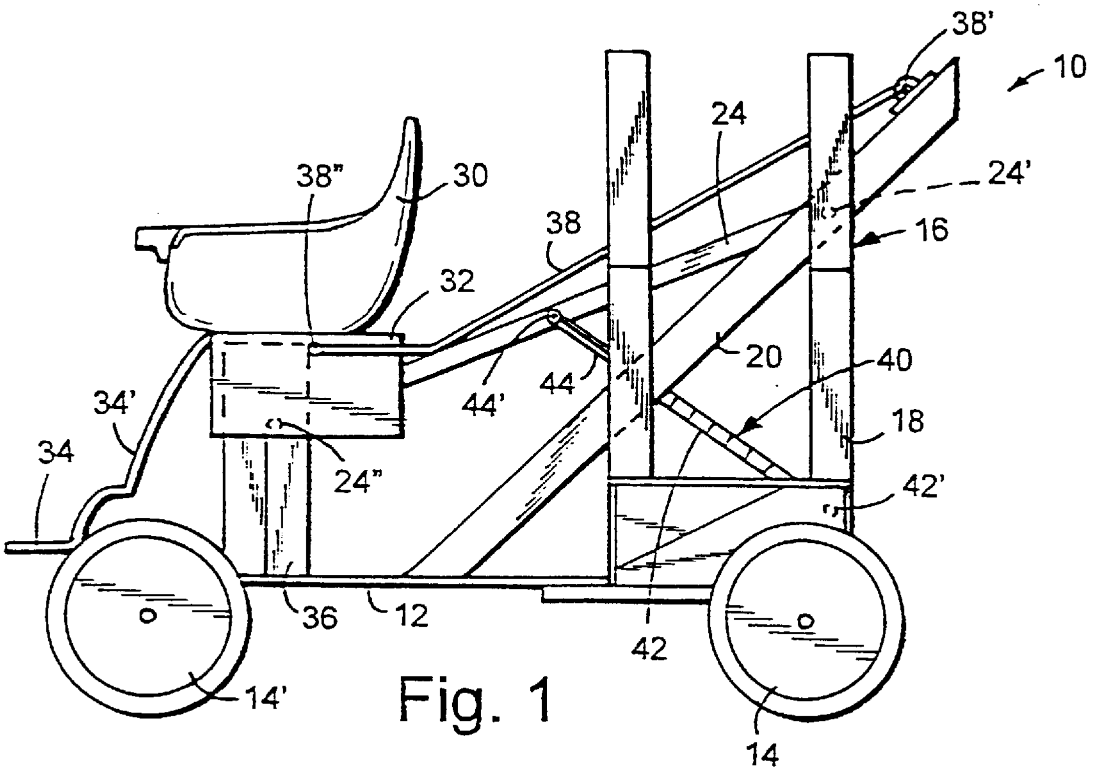
FIG. 1 is a side elevational view of the novel wheelchair in its lowered or down position.
Figure 2:
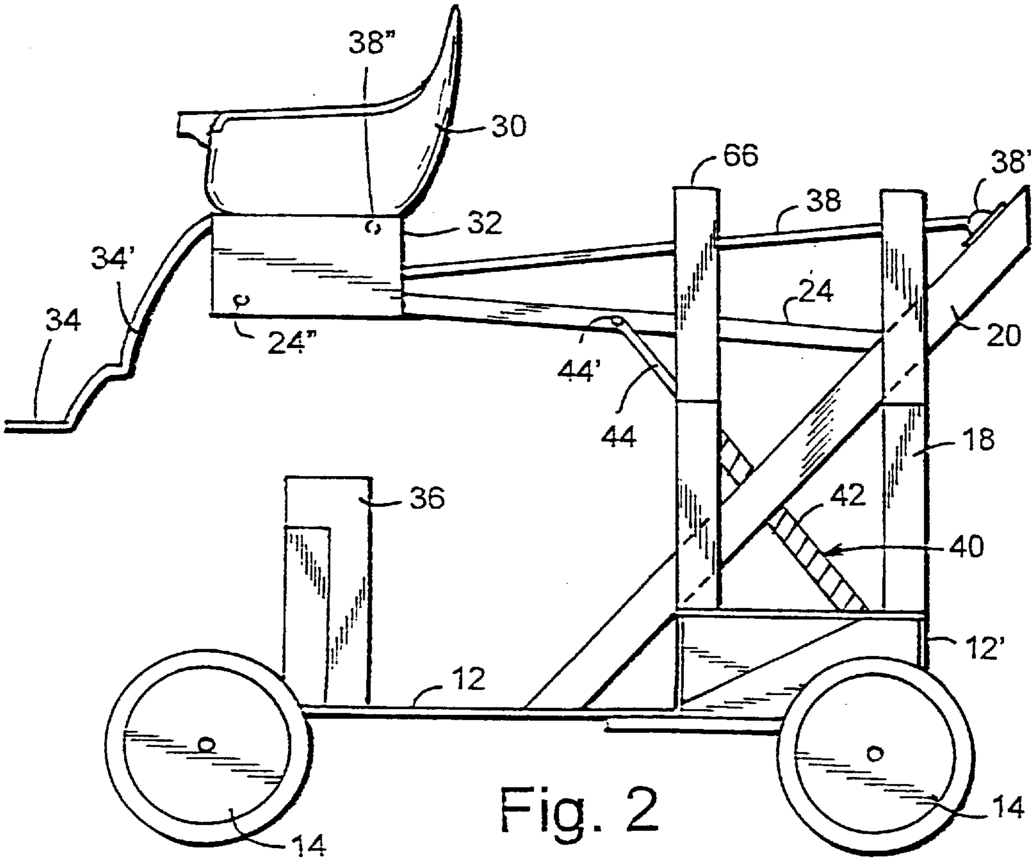
FIG. 2 is a side elevational view of the novel wheelchair in a partially elevated condition, a portion of the chair extending above the front wheels.
Figure 6:
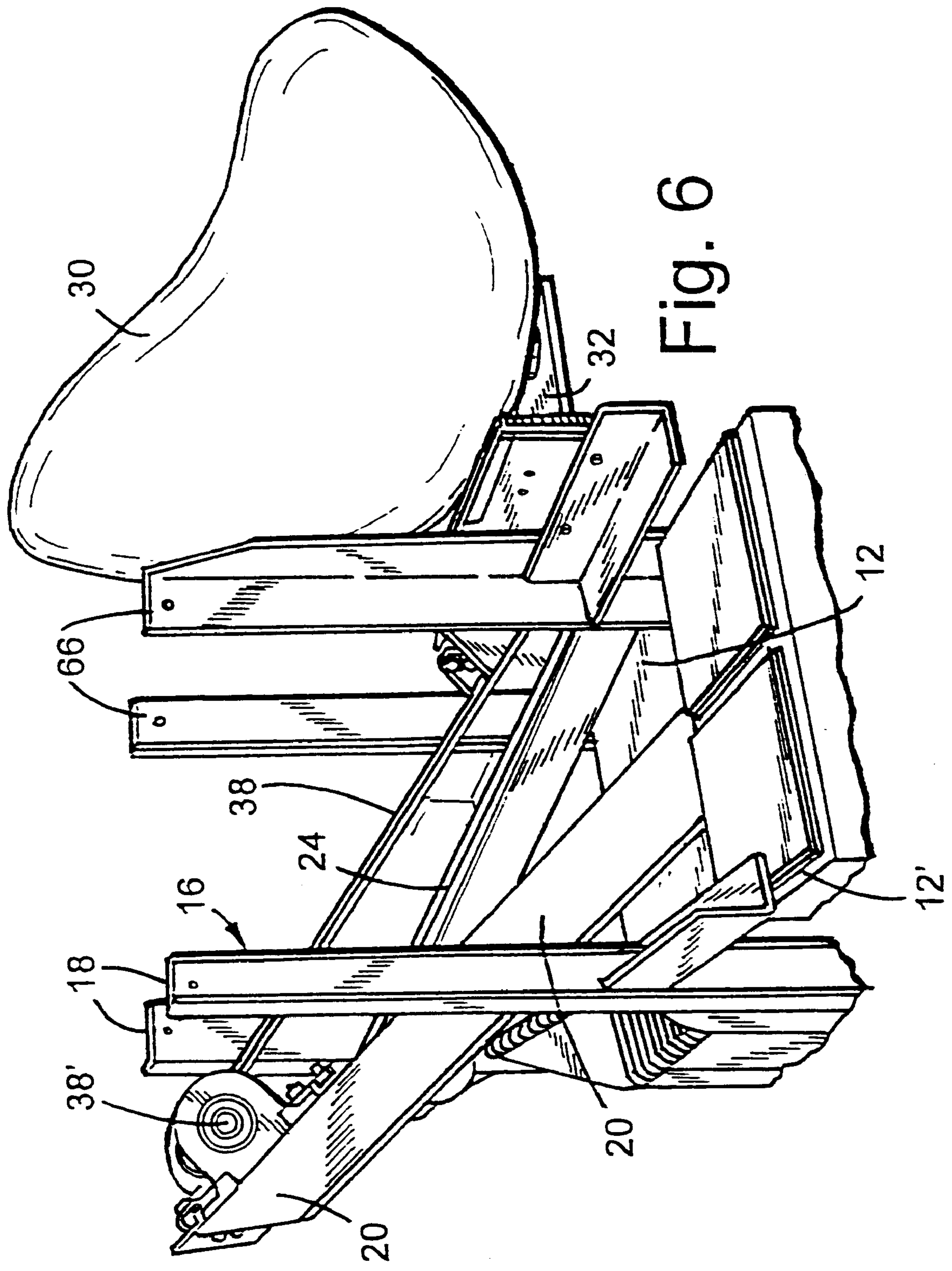
FIG. 6 is a fragmentary perspective view of the assembly at the frame and the rear ends of the cantilever beam and stabilizer arm.

Referring now specifically to the drawings, the elevated wheelchair assembly 10 has a horizontal platform 12 and a plurality of wheels mounted thereto, typically a pair of rear wheels 14 and a pair of front wheels 14', on axles, to enable the structure to travel over a surface. This platform 12 may be formed of any suitable material such as metal, wood or polymeric material, preferably metal. At the rear of platform 12 is an upstanding frame 16. This frame preferably includes a pair of laterally spaced, vertically extending pillars 18 (FIG. 6) having the lower ends attached as by weldment to an elevated portion 12' of the platform 12 (FIGS. 1 and 2). The frame also includes upwardly rearwardly extending diagonal members 20, the lower end of which is welded to platform 12 forwardly of pillars 18, and an upper intermediate portion being secured to pillars 18 as by weldment or bolts. Between pillars 18 is the rear end of an elongated rearwardly to forwardly extending cantilever beam 24. The rear end of beam 24 is pivotally mounted at 24' to frame 16, preferably to and between diagonal members 20 which also are between pillars 18. At the forward end of cantilever beam 24 is a seat or chair 30, preferably a molded polymeric shell-type seat, which is bolted to an underlying seat bracket 32 which depends below the seat. The connection between beam 24 and bracket 32 is a pivotal connection 24". Raising or lowering of cantilever beam about its pivot point 24' on frame 16 causes seat 30 to be raised or lowered. Cantilever beam 24 is lowered or raised by power hoist means, preferably in the form of a pair of laterally spaced, diagonally forwardly extending hydraulic cylinder assemblies 40. Each includes a cylinder 42, an internal piston (not visible) and an extended piston rod 44 of conventional type. The outer end of the piston rod is pivotally connected intermediate the ends of cantilever beam 24 at 44'. The lower end of cylinder 42 is pivotally connected to frame 16 at 42'. Foot rests 34 on extension arms 34' extend forwardly from seat 30 and seat bracket 32. Extending upwardly at the forward end of platform 12 is a fixed stop abutment 36, the upper surface of which engages beneath seat 30 in the seat lowermost position.

Also extending between frame 16 and seat 30 is an elongated stabilizing arm 38 positioned above cantilever beam 24. The rear end of arm 38 is pivotally connected at 38', by a suitable bearing, to the upwardly rearwardly extending end portion of member 20, with a suitable bearing, while the forward end is pivotally connected at 38" to seat bracket 32 immediately beneath seat 30. The stabilizing arm is spaced vertically above beam 24 and serves the dual purpose of controlling the pivotal position of seat 30 and also stabilizing the structure during seat elevation. Stabilizing arm 38 preferably has a dog leg configuration with a downwardly projecting apex being closely behind the back of seat 30.

Figure 7:
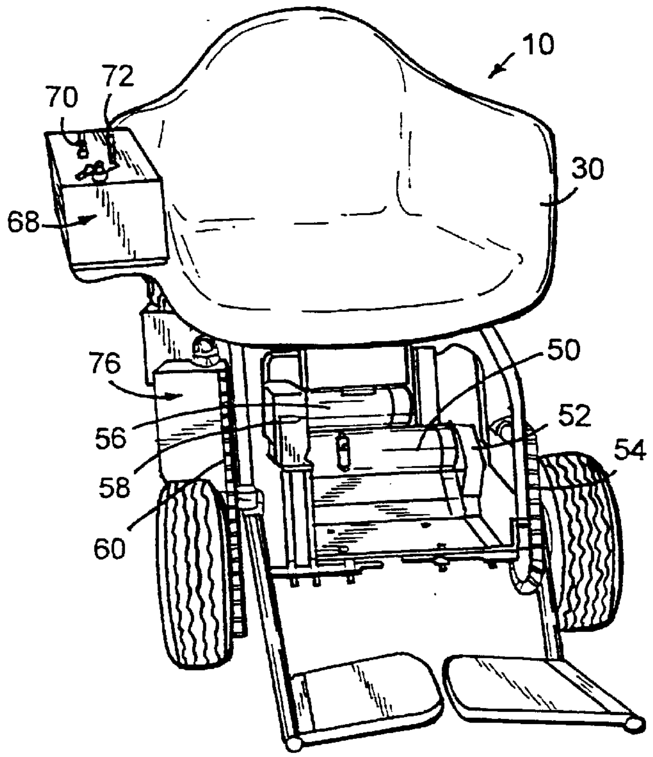
FIG. 7 is a front perspective view of the novel wheelchair.
Figure 8:
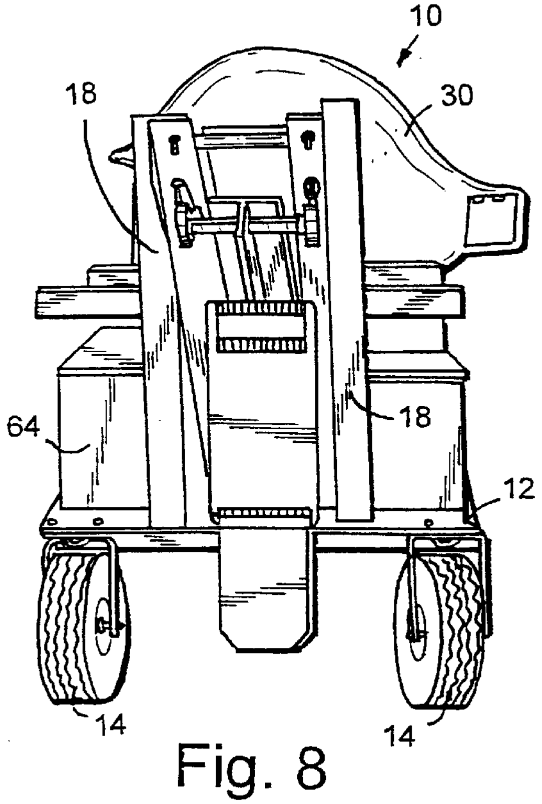
FIG. 8 is a rear perspective view of the novel wheelchair.

The wheelchair shown comprises a battery powered motorized wheelchair. More specifically, the left front wheel can be driven by an electric motor 50 through a gear box 52 and a chain and sprocket drive assembly 54 while the right front wheel (FIG. 7) can be driven by an electric motor 56 through a gear box 58 and a chain and sprocket drive assembly 60. These motors are energized by batteries 64 (FIG. 8), preferably mounted at the rear of platform 12 adjacent frame 16, retained by optional front pillars 66, for example. An electrical control assembly 68 containing a plurality of control switches 70 may be utilized in conventional manner to operate motors 50 and 56 individually or simultaneously, for desired directional movement forwardly or rearwardly of the wheelchair assembly 10. The rear wheels are mounted on vertically oriented pivotal shafts to allow the wheels to pivot on vertical axes during turning movement. Additional control switches 72 may be utilized to operate a motor driven pump for the hydraulic system 76 to actuate hydraulic cylinders 40. Alternatively, these hydraulic cylinders could be electrically driven screw and collar devices or the equivalent.

Figures 3, 4:
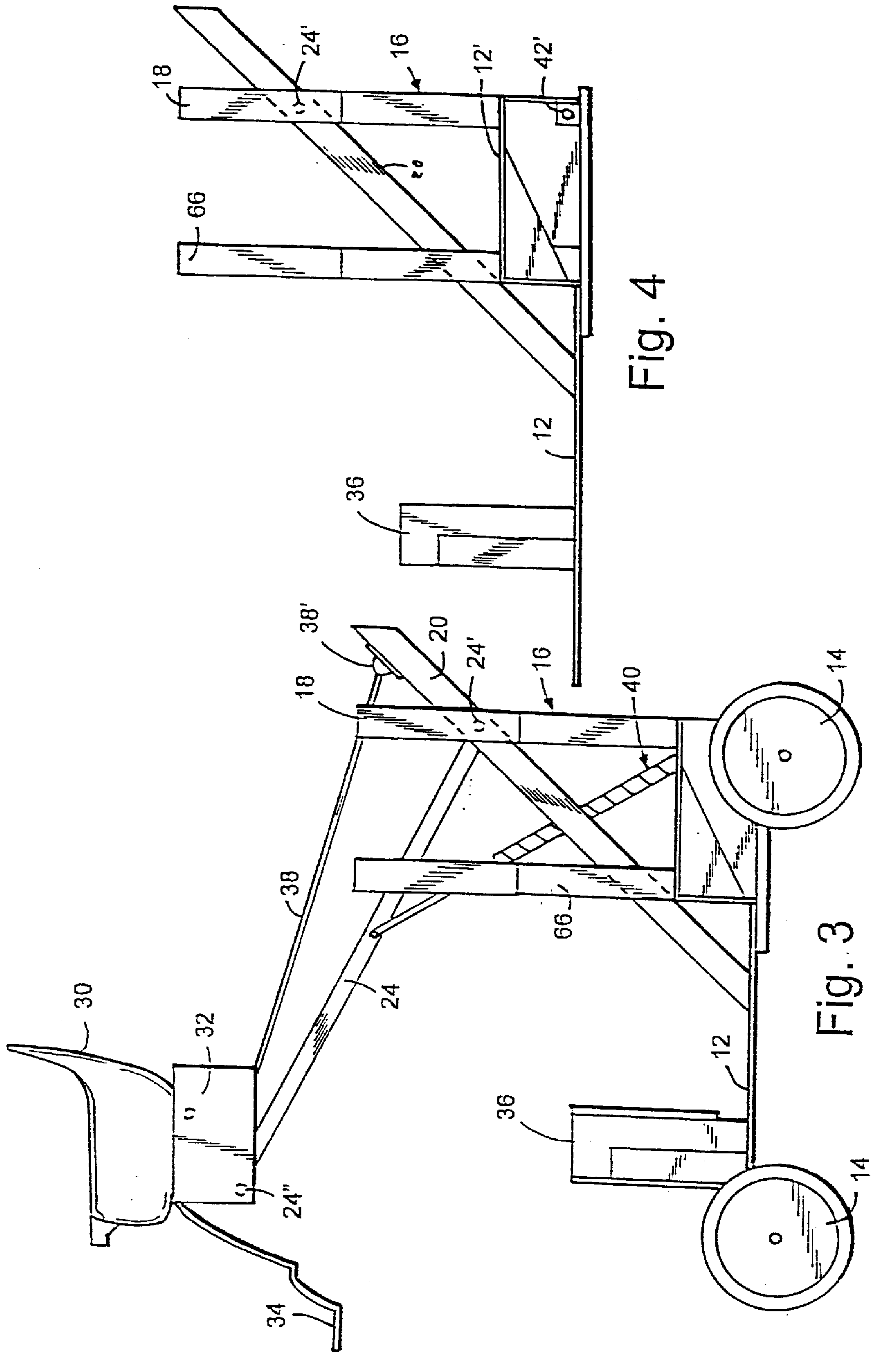
FIG. 3 is a side elevational view of the wheelchair in the fully hoisted position.
FIG. 4 is a side elevational view of the base and the upstanding frame.
Figure 5:
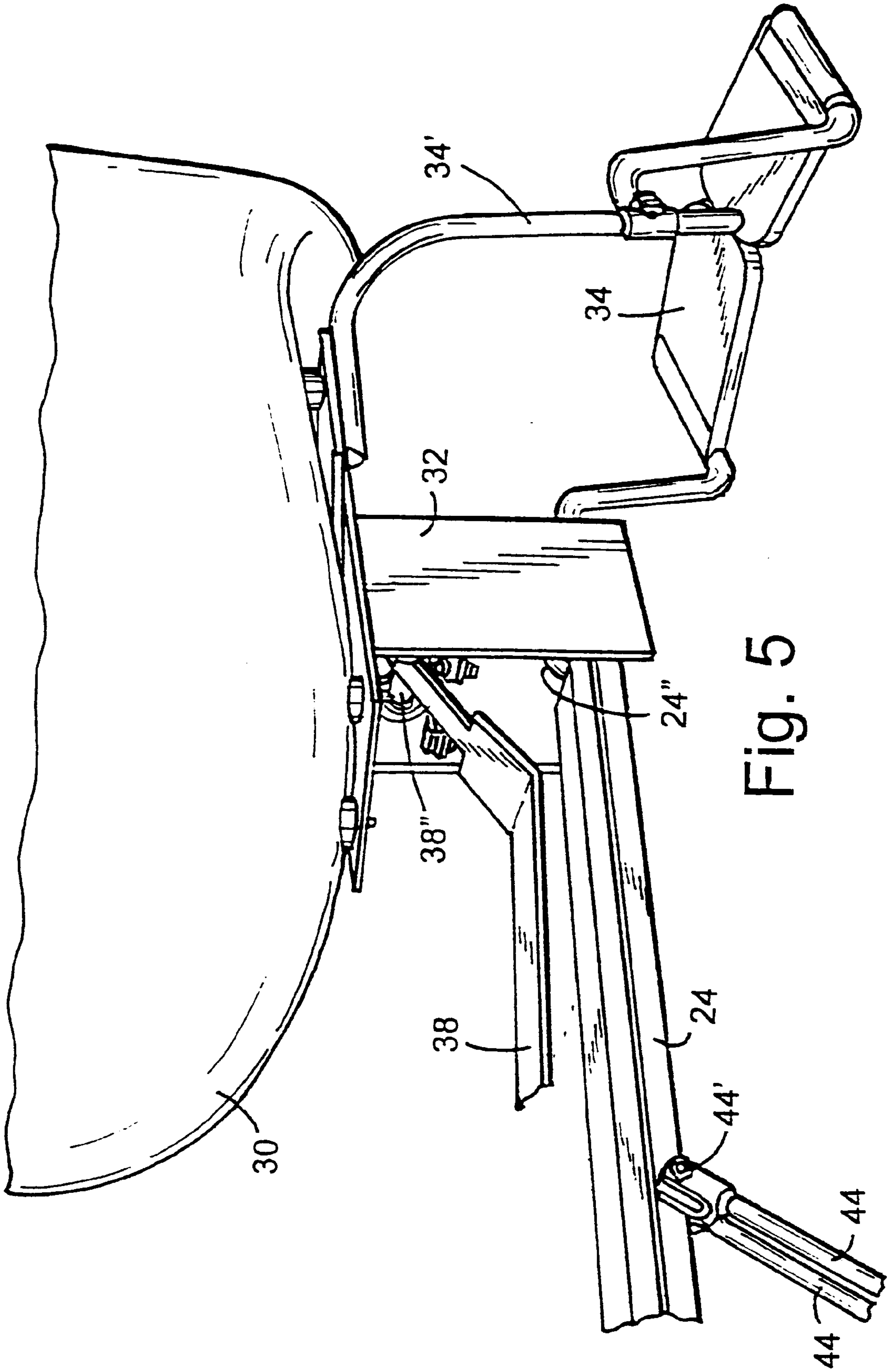
FIG. 5 is a fragmentary enlarged view of the assembly at the bottom of the seat and forward ends of the cantilever beam and stabilizer arm.

Operation of the hoist mechanism 40 enables the seat to be elevated in an unlimited number of positions between a fully lowered condition as depicted in FIG. 1, an intermediate elevated condition as depicted in FIG. 2, and a fully elevated condition as depicted in FIG. 3. As this elevational occurs, the seat moves from behind the front wheels in the lowered position, partially above the front wheels in the intermediate position, and again behind the front wheels in the fully elevated position. The location of the seat and weight of the person therein immediately behind the front wheels enables the front drive wheels to have maximum traction and with stability of the apparatus during movement across a surface. When the wheelchair is stopped and held in position by its stationary drive mechanism and optional wheel brakes, elevation of the seat moves it partly over the front wheels, enabling the person in the seat to have direct close access to the target area. Such a target area can be an elevated work surface, upper kitchen cabinets, an elevated area of a freezer/refrigerator, normal height countertops as for kitchen duties, the top of a washing machine, upper areas of storage closets or clothes closets, elevated windows; or for washing windows, painting or washing walls, changing light bulbs, serving store counters, as well as work in normal environments such as stocking shelves in stores, operating cash registers, using filing cabinets in offices, and athletic activities such as basketball or the like. These are just examples of the capabilities of this novel apparatus, to enable a handicapped person to perform duties/activities equivalent to nonhandicapped persons, and thereby lead a most useful life. The particular elevated condition can be selected and then retained as long as necessary. In the fully elevated position, the chair again moves behind the front wheels for maximum stability. Elevations of six feet or more are readily obtained as has been established by operation of an experimental unit. The batteries and other equipment on the rear of the platform also add stability. During elevation of the seat, stabilizing arm 38 controls the pivotal angle of the seat. In the lowermost position the seat is tilted a few degrees rearwardly for maximum comfort and stability. At the partially elevated position the seat becomes generally horizontal, for best functioning by the person. In the fully elevated condition, the seat again is tilted a few degrees to the rear for maximum stability.

The above description is considered that of the preferred embodiment(s) only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

The embodiments of the invention in which an exclusive property or privilege is claimed are defimed as follows:

1. An elevatable wheelchair comprising:

a horizontal base having a front and a rear and a plurality of front and rear wheels on said base for traveling over a surface;

a support frame upstanding from said rear of said base;

a cantilever beam having front and rear ends, and pivotally attached at said rear end to said frame, spaced above said base;

said cantilever beam being pivotal at said rear end to move between a lowered position sloping downwardly toward said cantilever beam front end, an intermediate position extending generally forwardly horizontally toward said cantilever beam front end, and a fully elevated position sloping upwardly toward said cantilever beam front end;

a seat pivotally mounted on said forward end of said cantilever beam;

a power lift operably connected to said cantilever beam for pivoting said beam on said frame, to thereby elevate or lower said beam forward end and said seat; and a stabilizing arm extending between said seat and said frame, vertically offset from said beam, and movable with said beam and said seat to control seat pivot orientation, and stabilize said seat;

said stabilizing arm being positioned and oriented to cause said seat in said fully elevated position to be pivoted through a small angle backwardly in orientation so as to tilt a person backwardly at a small angle.

2. The elevatable wheelchair in claim 1 wherein said upstanding frame comprises vertical rear pillars mounted to said base and diagonal bracing member extending between said base and said pillars to cause said frame to be triangular in side elevation.

3. The elevatable wheelchair in claim 1 wherein said seat is movable between at least a lowered position, an intermediate partially raised position, and a fully elevated position, said seat in said lowered position being behind said front wheels, in said intermediate position being partially above said front wheels, and in said fully elevated position being again behind said front wheels.

4. The elevatable wheelchair in claim 1 wherein said stabilizing arm is positioned and oriented to cause said seat in said lowered position to be pivoted through a small angle backwardly in orientation so as to tilt a person backwardly at a small angle.

5. The elevatable wheelchair in claim 3 wherein said stabilizing arm has a rear end pivotally connected to said frame above said beam, and positioned and oriented to cause said seat in said intermediate position to be basically untilted.

6. The elevatable wheelchair in claim 1 wherein said stabilizing arm has a forward end pivotally connected beneath said seat above said beam.

7. The elevatable wheelchair in claim 5 wherein said stabilizing arm has a forward end pivotally connected beneath said seat above said beam.

8. The elevatable wheelchair in claim 7 wherein said stabilizing arm has a dog leg type configuration.

9. The elevatable wheelchair in claim 1 wherein said seat is a polymeric chair shell having a back and sides.

10. The elevatable wheelchair in claim 6 wherein said seat has a depending bracket, and said beam forward end and said stabilizing arm forward end being pivotally attached to said depending bracket.

11. The elevatable wheelchair in claim 9 wherein said seat includes an underlying bracket, said shell is mounted on said bracket, and said beam forward end and said stabilizing arm forward end are both pivotally mounted to said bracket vertically offset from each other.

12. The elevatable wheelchair in claim 1 wherein said power lift is connected between said base and said beam intermediate said ends of said beam, and is extensible to vertically shift said beam and said seat.

13. The elevatable wheelchair in claim 12 wherein said power lift comprises hydraulic cylinders.

14. The elevatable wheelchair in claim 1 including a power drive to said wheels.

* * * * *